United States Patent [19]

Neary et al.

[11] Patent Number: 5,274,533
[45] Date of Patent: Dec. 28, 1993

[54] REFLECTOR ASSEMBLY HAVING IMPROVED LIGHT REFLECTION AND BALLAST ACCESS

[76] Inventors: Robert A. Neary, P.O. Box 816, Middletown, Md. 21769; Robert V. Neary, 923 Gist Ave., Silver Spring, Md. 20910; Bruce Boyle, 2702 Cotter Rd., Millers, Md. 21107

[21] Appl. No.: 645,652

[22] Filed: Jan. 25, 1991

[51] Int. Cl.⁵ ................................. F21S 3/02
[52] U.S. Cl. .................... 362/225; 362/221; 362/260; 362/297
[58] Field of Search ........... 362/147, 217, 225, 241, 362/247, 301, 306, 341, 346, 260, 216, 221, 297

[56] References Cited

U.S. PATENT DOCUMENTS

| | | | |
|---|---|---|---|
| 2,596,634 | 5/1932 | Wince | 362/222 |
| 4,174,533 | 11/1979 | Barthes et al. | 362/346 |
| 4,336,576 | 6/1982 | Crabtree | 362/247 |
| 4,388,675 | 6/1983 | Lewin | 362/225 |
| 4,499,529 | 2/1985 | Figueroa | 362/283 |
| 4,536,830 | 8/1985 | Wisniewski | 362/223 |
| 4,562,517 | 12/1985 | Pankin | 362/147 |
| 4,599,684 | 7/1986 | Lee | 362/217 |
| 4,616,296 | 10/1986 | Westgaard et al. | 362/301 |
| 4,641,226 | 2/1987 | Kratz | 362/218 |
| 4,748,547 | 5/1988 | Baker | 362/217 |
| 4,870,549 | 9/1989 | Lauckhardt et al. | 362/217 |

FOREIGN PATENT DOCUMENTS

| | | | |
|---|---|---|---|
| 1095363 | 12/1954 | France | 362/225 |
| 0145378 | 12/1978 | Japan | 362/225 |

*Primary Examiner*—Richard R. Cole
*Attorney, Agent, or Firm*—Ostrolenk, Faber, Gerb & Soffen

[57] ABSTRACT

A reflector assembly for fluorescent luminaires. The reflector assembly improves the lumen output of the fixture by bringing light from the backside of the lamps around the lamps and out of the luminaire. Access to the ballast of the luminaire is improved by providing a removable section of the reflector assembly located over the ballast.

20 Claims, 7 Drawing Sheets

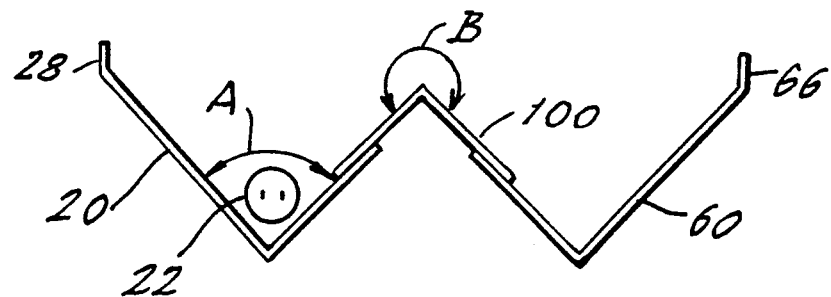
_FIG. 3_
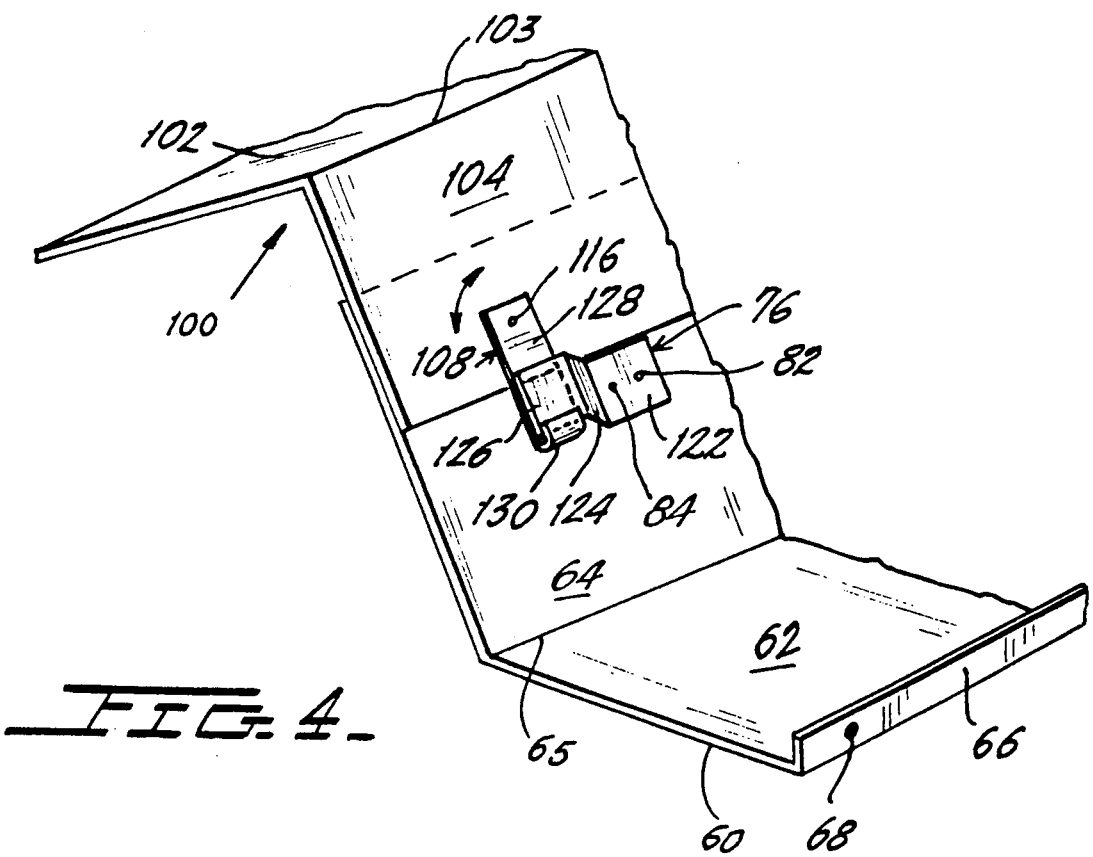
_FIG. 4_

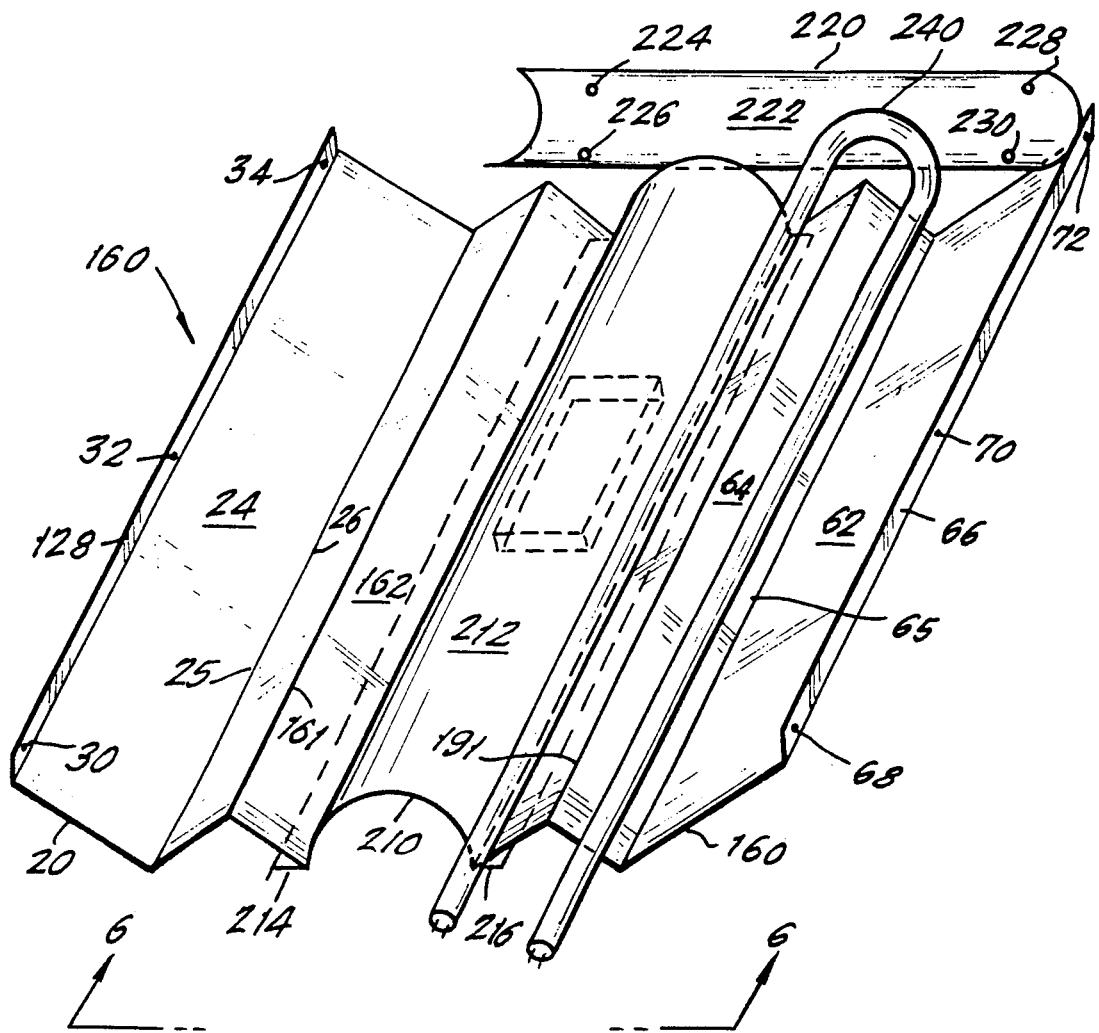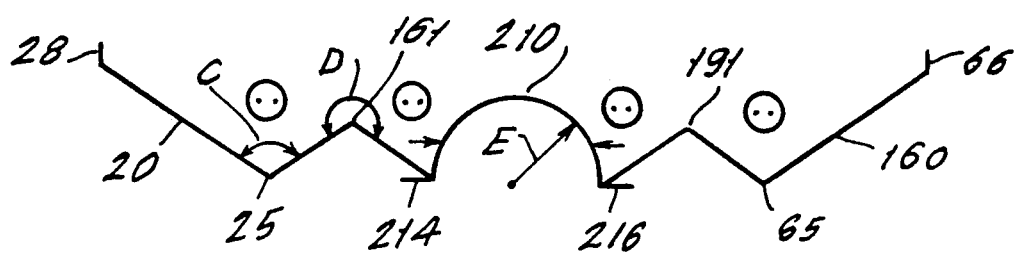

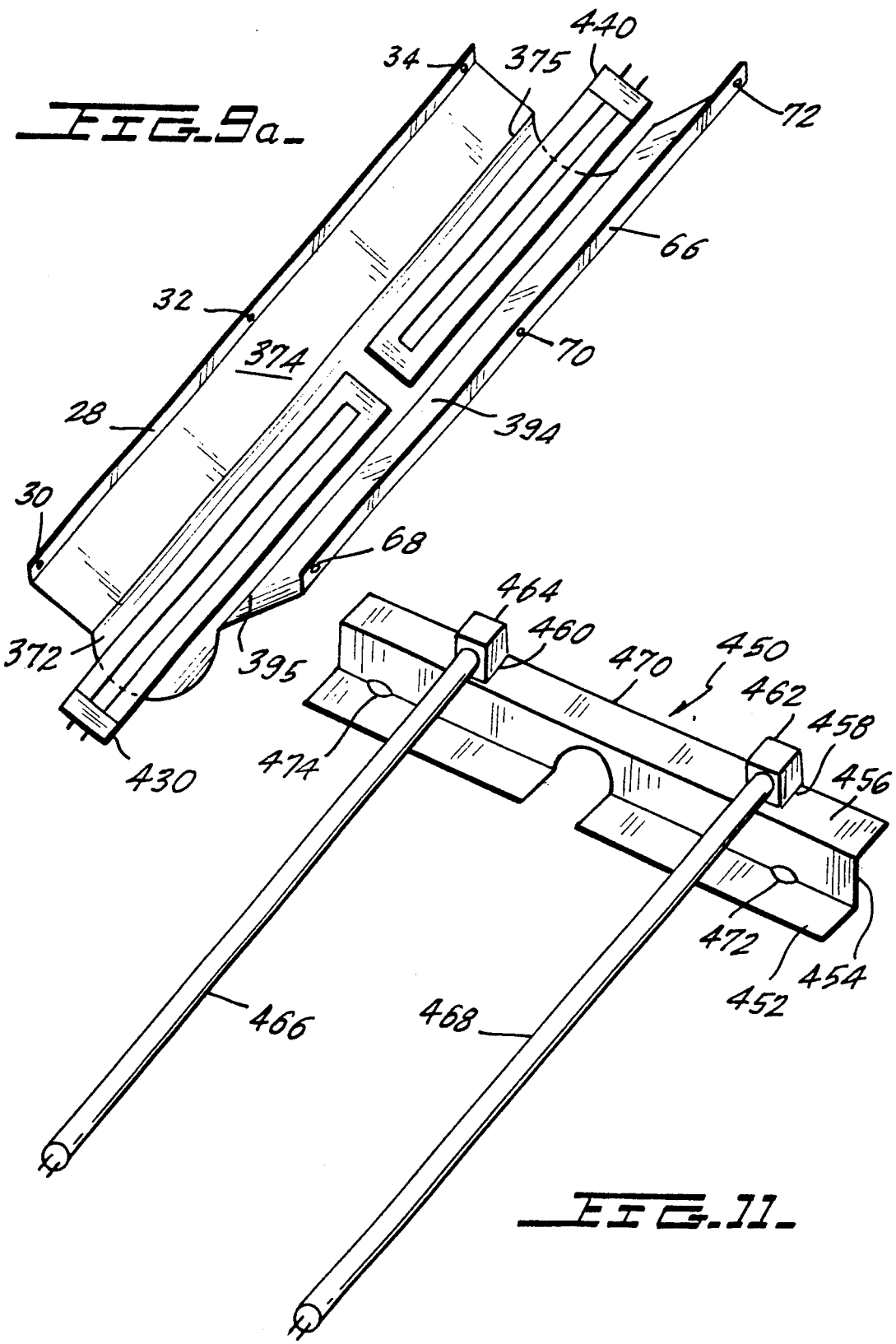

REFLECTOR ASSEMBLY HAVING IMPROVED LIGHT REFLECTION AND BALLAST ACCESS

BACKGROUND OF THE INVENTION

1. Field of the Invention

The present invention relates to luminaires or light fixtures and, more particularly, a reflector assembly for fluorescent luminaires which increases the lumen output of the luminaire and provides easy access to a ballast of the light fixture.

2. Description of the Related Art

Fluorescent fixtures are well known. They are extensively used to provide light in homes, offices, etc.

Referring to FIG. 1, a common fluorescent luminaire 1 includes four fluorescent bulbs or lamps 2a–2d mounted on raceways 3 and 4 which are attached to an interior of housing 5. Ballast 6 is provided for stabilizing current in fixture 1, and is usually attached to housing 5 in an interior, central region thereof between lamps 2b and 2c, and is enclosed within a ballast cover 6a. A translucent plastic cover 7 encloses the lamps. Other common fluorescent luminaires such as luminaires for U-shaped lamps or twin tube lamps, which are also known as single-ended lamps (discussed below), include only one raceway because these types of lamps have sockets on only one end.

A significant amount of light emitted from a fluorescent lamp is wasted (whether or not a reflector is used) because it emanates from a backside of the lamp, i.e., the side facing the reflector assembly, and is reflected by the reflector assembly back into the lamps. Attempts have been made to provide a reflector assembly which will increase the efficiency of the lamps by minimizing the amount of light wasted in this manner.

U.S. Pat. No. 4,388,675 to Lewin discloses a fluorescent luminaire with an inverted V-shaped reflector located beneath each of the lamps, the apex of the V being aligned with the axis of the lamp which the reflector underlies.

U.S. Pat. No. 4,641,226 to Kratz teaches a luminaire reflector assembly having a V-shaped cross-section. A first relatively gently sloped surface of the reflector assembly reflects light from a backside of a fluorescent lamp onto a second relatively steeply sloped surface of the reflector assembly, which in turn reflects the light between adjacent lamps and out of the light fixture.

These and the other known reflector assemblies, however, generally do not substantially increase the lumen output of the fixture. It would be advantageous to have a reflector assembly which increases the efficiency of a luminaire.

Another disadvantage of the known reflector assemblies is that they block access to the ballast because they are mounted to the luminaire behind the fluorescent lamps, but over the ballast. If the ballast needs to be serviced or replaced, the whole reflector assembly must be removed from the luminaire. It would be advantageous if the ballast could be accessed without removing the entire reflector assembly.

SUMMARY OF THE INVENTION

Accordingly, it is an object of the invention to provide a novel reflector assembly for a fluorescent luminaire which improves the lumen output of the fixture.

Another object of the invention is to provide an improved reflector assembly for fluorescent luminaires which provides for quick and easy access to the ballast of the luminaire.

These and other objectives are achieved by providing a reflector assembly which includes first and second light reflecting sections, each section comprising substantially flat first and second light reflecting surfaces and a crease located therebetween. The first and second light reflecting surfaces are oriented at an angle less than 180° with respect to each other. The reflecting surfaces includes a specular coating for reflecting light from the fluorescent light bulbs. A raceway with socket holders is included for holding the fluorescent lamps and for positioning the lamps in alignment with the creases and at a distance from the creases such that light emanating from the fluorescent lamps is reflected around the lamps and out of the luminaire to increase the lumen output thereof.

Preferably, the angle between the first and second light reflecting surfaces is between about 10° and about 170°, most preferably between about 115° and about 125°. The specular coating preferably comprises an anodic oxide coating on an aluminum sheet. The raceway preferably positions the lamps at a distance of about 1.5 to about 2 inches from the creases, most preferably at about 1.75 inches. The reflector assembly may include one or more mounting flanges located on the light reflecting sections for mounting the reflector assembly onto an interior of a housing of the fluorescent luminaire. The mounting flange may include mounting holes for this purpose.

A reflector assembly is also provided for a fluorescent luminaire having two twin tube, single-ended fluorescent lamps. In this case, instead of substantially flat light reflecting surfaces, this assembly includes first and second light reflecting sections, each section comprising a curved reflecting surface. Preferably, the curved reflecting surfaces have a radius of curvature between about 3.5 and about 7.5 inches. The raceway preferably comprises means for positioning the bulbs at a distance of about 1.5 to about 2 inches from the curved reflecting surfaces.

The present invention also provides improved access to a ballast of a fluorescent luminaire. To this end, the reflector assembly includes a removable light reflecting section located over the ballast of the luminaire. Preferably, the removable section is located between the first and second light reflecting sections and is attached thereto with S-shaped brackets and cooperating rotatable arms mounted on the removable light reflecting section which engage the brackets to lock the first and second light reflecting and removable sections together. In an alternative embodiment, the removable section is squeezably disengagable from the first and second light reflecting sections. If so, two or more flanges extend from the removable section for releasably engaging the first and second light reflecting sections. In yet another embodiment, the removable section may be a portion of one of the first and second light reflecting sections. In this case, one or more flanges extend from this portion to releasably engage the other light reflecting section.

BRIEF DESCRIPTION OF THE DRAWINGS

Other features and advantages of the present invention will become apparent when the following description is read in conjunction with the accompanying drawings, in which:

FIG. 3 shows an end view of the reflector assembly shown in FIG. 2 along lines 3—3 of FIG. 2 and the angular orientation of several light reflecting surfaces of the reflector assembly.

FIG. 4 shows in greater detail a portion of the reflector assembly of FIG. 2, including locking means for securing together sections of the reflector assembly.

FIG. 5 shows a plan view of another reflector assembly of the invention for use with two U-shaped fluorescent lamps (only one lamp is shown), and in phantom, the position of a ballast located thereunder.

FIG. 6 shows an end view of the reflector assembly shown in FIG. 5 along lines 6—6 thereof and the angular orientation of several light reflecting surfaces of this reflector assembly.

FIG. 9A shows a modified elongated reflector of FIG. 9.

FIG. 11 shows a plan view of a raceway and two straight fluorescent lamps attached thereto.

DETAILED DESCRIPTION OF THE PREFERRED EMBODIMENTS

Figure 1:
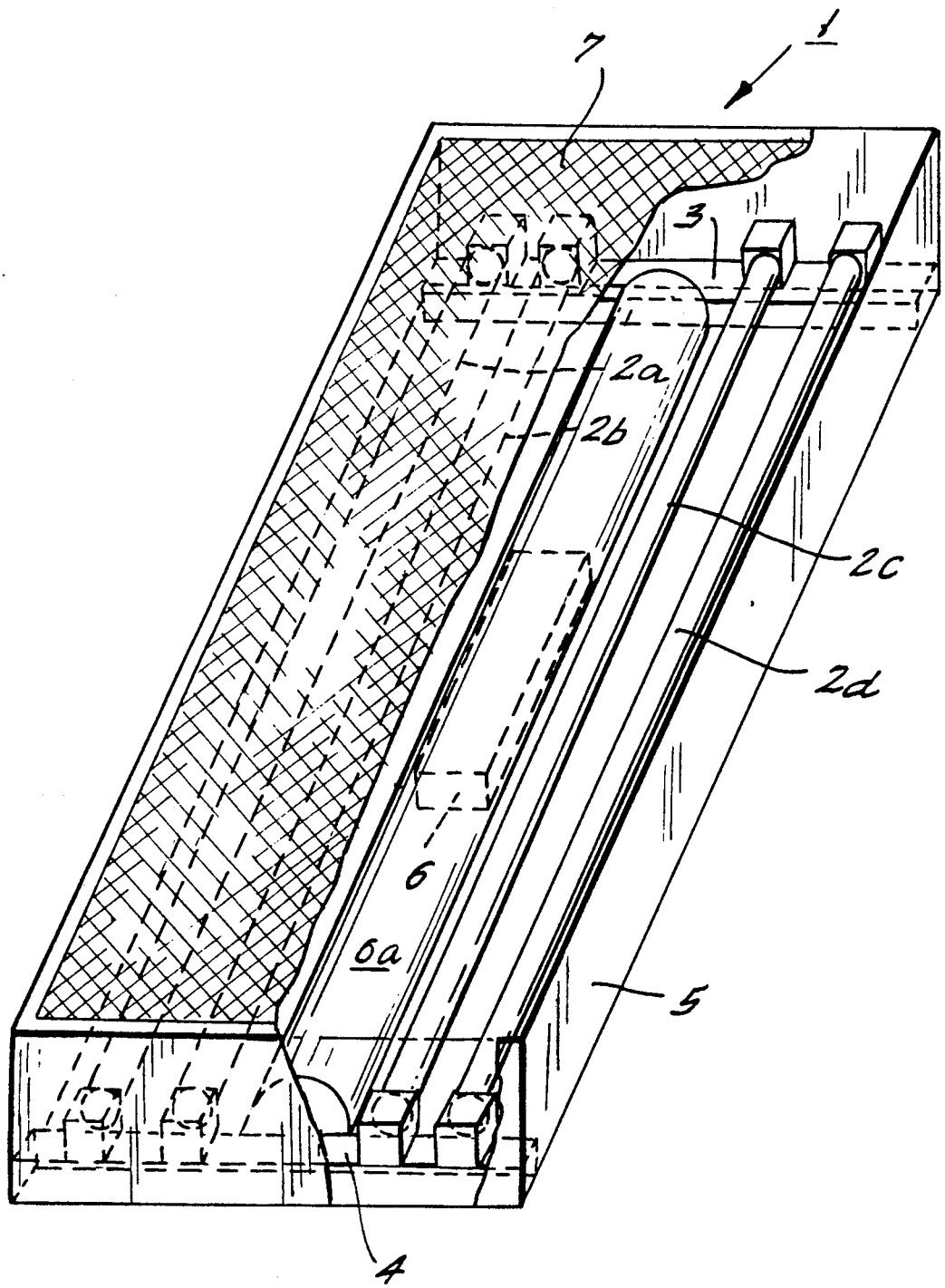
FIG. 1 shows a conventional, four-lamp, fluorescent luminaire wherein a cover and housing of the luminaire are shown partially broken away to expose two bulbs, portions of the raceways and the ballast of the luminaire.
Figure 2:
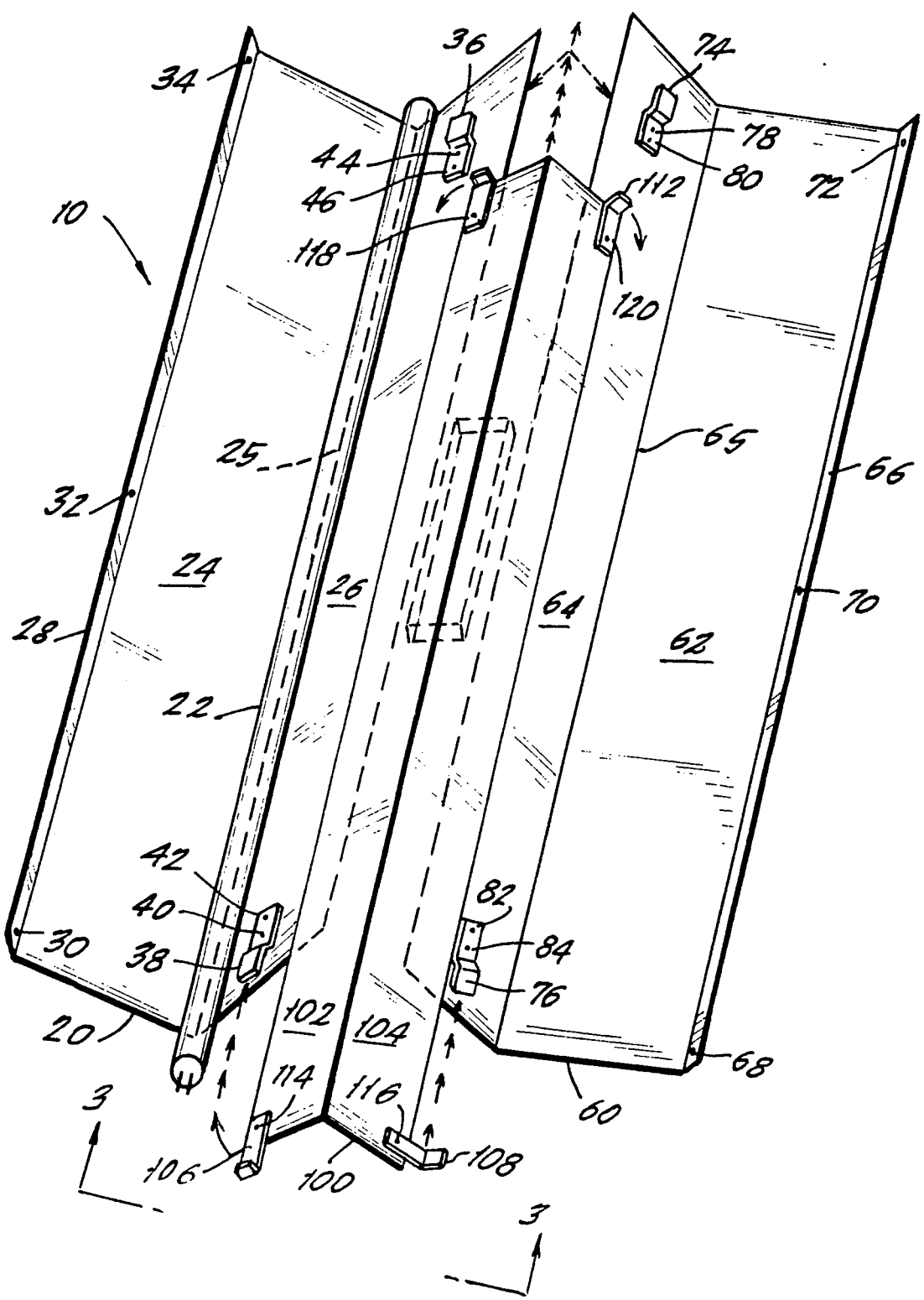
FIG. 2 shows an exploded plan view of a reflector assembly of the invention, and in phantom, the position of a ballast located thereunder.

Referring now to the drawings wherein like numbers indicate like elements, there is shown in FIGS. 2-4 a reflector assembly in accordance with the principles of the invention and designated generally as 10. Reflector assembly 10 includes a first light reflecting section 20, a second light reflecting section 60 and a removable light reflecting section 100. Reflector assembly 10 is designed for retrofitting existing fluorescent luminaires such as shown in FIG. 1, as will be discussed in more detail below, but may also be incorporated into new fluorescent luminaires.

Light reflecting section 20 includes a first substantially flat light reflecting surface 24, a second substantially flat light reflecting surface 26 adjacent to surface 24, and a crease 25 located therebetween. Straight fluorescent lamp 22 is positioned with its longitudinal axis substantially aligned with crease 25. On the outer edge of light reflecting section 20 is a mounting flange 28 provided with mounting holes 30, 32 and 34 for mounting section 20 to an interior of a luminaire housing (not shown).

Light reflecting section 60 is equivalent to section 20 discussed above. It includes substantially flat and adjacent light reflecting surfaces 62 and 64; a crease 65, mounting flange 66 and mounting holes 68, 70 and 72. It will be understood that a second, straight fluorescent lamp (not shown), identical to fluorescent lamp 22, is aligned along crease 65 when assembly 10 is incorporated into a luminaire housing.

Removable light reflecting section 100 includes a substantially flat light reflecting surface 102, a substantially flat and adjacent light reflecting surface 104 and a crease 103 located therebetween. Light reflecting section 100 is centrally positioned between light reflecting sections 20 and 60 and is mounted thereon by brackets 36, 38, 74 and 76, which cooperate with rotatable latches 106, 108, 110 and 112 located on removable section 100.

Bracket 76 and rotatable latch 108 are shown in greater detail in FIG. 4. The operation of this bracket and latch will now be explained, it being understood that the operation of the other remaining brackets and latches is equivalent. When all latches are released from their respective brackets, the entire section 100 may be removed such that a ballast (shown in phantom in FIG. 2) located behind removable section 100 may be accessed by removal of section 100 without removal of entire reflector assembly 10.

Bracket 76 has a S-shaped profile, when viewed from its side, and includes a first flat portion 122 that is mounted to reflecting surface 64 of second reflecting section 60 by pins 82 and 84. A second portion 124 of the bracket extends in an upward direction and at an acute angle away from flat portion 122. A third portion 126 of the bracket extends horizontally away from second portion 124 and is spaced away from surface 64 a distance which corresponds to the height of the portion 124. Rotatable latch 108 includes a first flat portion 128 which is rotatable in the direction shown by the arrow and mounted onto surface 104 of removable section 100 by pin 116. A second portion 130 located on a distal end of flat portion 128 extends upward, substantially perpendicularly away from first portion 128 for engaging the portion 126 of bracket 76.

Similarly, bracket 74 (FIG. 2) is mounted by pins 78 and 80 onto surface 64 and cooperates with rotatable latch 120 which is rotatably mounted by pin 120 onto surface 104. Bracket 36 is mounted by pins 44 and 46 upon surface 26 of light reflecting section 20 and cooperates with rotatable latch 110 which is rotatably mounted by pin 118 upon surface 102 of removable section 100. Bracket 38 is mounted upon surface 26 of light reflecting section 20 by pins 40 and 42 and cooperates with rotatable latch 106 which is rotatably mounted upon surface 102 of removable light reflecting section 100 by pin 114.

Referring now to FIG. 3, there is shown the angular orientation of reflecting surfaces 24, 26, 62, 64, 102 and 104. The exact angular orientation of these surfaces will depend upon the distance of the bulbs from creases 25 and 65, as will be discussed below in connection with the raceway. It is preferred that surfaces 24 and 26 make an angle A with each other which is between about 10° and about 170°, most preferably between about 115° and about 125°. Light reflecting surfaces 62 and 64 have the same angular relationship. It is preferred that surfaces 102 and 104 make an angle B with each other which is between about 190° and about 350°, most preferably between about 235° and about 245°.

Light reflecting sections 20, 60 and 100 may comprise any suitable material. Preferably, these sections comprise aluminum sheet having a specular coating on all the light reflecting surfaces, with creases 25 and 65 preferably comprising bent portions of the coated aluminum sheet. The specular coating may be any suitable mirror-like coating, such as a conventional reflective MYLAR tape applied to a metallic sheet. A preferred material for the light reflecting sections comprises COILZAK Lighting Sheet available from Full Service Lighting, Inc. whose address is 2702 Cotter Rd., Millers, Md. 21107. This material comprises aluminum sheet having an anodic oxide coating thereon. It is preferred because it will not deteriorate due to exposure to fluorescent lamp radiation and will not peel, blister or delaminate after application. Moreover, the anodic oxide coating will not burn and emit toxic fumes, and is static-free so as to not attract dust or dirt. The hardness of the anodic oxide coating is about 9 on a Moh scale (which is comparable to the hardness of sapphire). The anodic oxide coating has a high degree of formability, and, even if severely damaged due too forming, will not lose its reflective capacity. The anodic coating has excellent resistance to organic solvents, and is impervious to dust and dirt in normal environments.

Lamp 22 is positioned with respect to reflector assembly 10 by a raceway which is not shown in FIG. 2. Referring to FIG. 11, raceway 450 is shown which includes a base portion 452 which is attached to an interior surface of a light fixture. Upstanding portion 454 extends substantially perpendicularly from base portion 452. Top, horizontally-oriented portion 456 extends from portion 454. Notches 458 and 460 are provided in top portion 456 to receive fluorescent lamp footer mounts 462 and 464 which include sockets (not shown) for receiving straight fluorescent lamps 466 and 468. A notch 470 is provided in portions 452 and 454 for allowing ballast wires to pass therethrough. Holes 472 and 474 are provided in the region where base portion 452 and upstanding portion 454 meet for mounting of the raceway 450 to footers (not shown) on an interior of a light fixture.

It has been discovered that a fluorescent luminaire having a superior lumen output can be achieved in accordance with the invention provided that the raceway substantially aligns the fluorescent lamps along creases of the reflector assembly and at a distance from the creases such that light emanating from a backside of the lamps is brought around the lamps, and provided that the reflecting surfaces of the reflecting assembly have a specular coating thereon. Preferably, the bulbs are positioned at a distance of about 1.5 to about 2 inches from the creases, most preferably about 1.75 inches.

In accordance with the invention, existing fluorescent luminaires (as shown for example in FIG. 1) may be retrofitted to include the reflector assembly 10 by mounting the reflector assembly using the mounting flange and holes discussed above to the inside of the luminaire housing using screws, or any suitable attaching means. It has been found that when retrofitting conventional four-lamp fluorescent luminaires with the reflector assembly shown in FIGS. 2-4, the efficiency of the luminaire is increased to such a degree that one lamp may be removed and yet the illumination level would be approximately the same or better depending on the efficiency of the original fixture.

In connection with the foregoing, the inventors have adapted the principles of the invention discussed above for use with fluorescent luminaires for lamps other than straight fluorescent lamps, more specifically U-shaped and twin tube lamps. It will be understood that the inventive features of the reflector assembly described above including, but not limited to, the alignment of the lamps along the creases, the distance of the lamps from the crease, the specular coating and the removable section are also part of the specialized reflector assemblies which will now be described.

Referring now to FIGS. 5 and 6, a reflector assembly 160 is shown in accordance with the principles of the invention but which is adapted for use in fluorescent luminaires utilizing U-shaped fluorescent lamps. One U-shaped fluorescent lamp 240 is shown. Reflector assembly 160 includes first light reflecting section 20 and second light reflecting section 60 which are modified for the U-shaped lamp, and a removable light reflecting section 210.

Light reflecting sections 20 and 60 in this embodiment include an additional light reflecting surface and crease for reflecting light emitted from the U-shaped lamps. In section 20, light reflecting surface 162 is provided adjacent light reflecting surface 26. Crease 161 is located between surfaces 162 and 26. In section 60, light reflecting surface 192 is provided adjacent light reflecting surface 64 and crease 191 is located between these surfaces. Light reflecting surfaces 162 and 192 each include a free edge along the sides thereof away from creases 161 and 191, respectively, which abut against removable light reflecting section 210.

Removable light reflecting section 210 is centrally located between light reflecting sections 20 and 60. Removable light reflecting section 210 is curved or bell-shaped when viewed from its end (see FIG. 6), and includes curved light reflecting surface 212 and flanges 214 and 216 extending along outer sides of section 210. Light reflecting section 210 is squeezable in the direction shown by the arrows (FIG. 6) to disengage flanges 214 and 216 from light reflecting sections 20 and 60 to access a ballast (shown in phantom) located under reflector assembly 160.

A backplate reflector 220, which may be curved or flat, is preferably provided at an end of the light fixture away from the raceway to reflect additional light from the U-shaped bulbs and make the light fixture more efficient. Backplate reflector 220 includes a light reflecting surface 222 which may be flat (not shown) or have a radius of curvature up to about 5 inches, and mounting holes 224, 226, 228 and 230 for mounting backplate reflector 220 to an interior of a luminaire housing (not shown).

A single U-shaped lamp 240 is shown in light reflecting section 60. It will be understood that another U-shaped lamp (not shown) would be similarly arranged within light reflecting section 20. Lamp 240 is positioned by a raceway (not shown) as discussed above such that its straight portions are substantially aligned with crease 65 and the free edge of surface 192 and are distanced from crease 65 and the edge such that light emanating from the back of the lamp is substantially brought around bulb 240.

Referring to FIG. 6, it is preferred that surfaces 24 and 26 make an angle C with each other which is equivalent to angle A discussed above, and surfaces 26 and 162 make an angle D with each other which is between about 185° and about 225°, most preferably between about 195° and about 205°. Light reflecting section 60 includes the same angular relationship between surfaces 62, 64 and 192. Removable section 210 preferably has a radius of curvature between about 2 inches and about 2.25 inches, most preferably between about 2 1/16 (2.0625) inches and about 2 3/16 (2.1875) inches.

Figure 7:
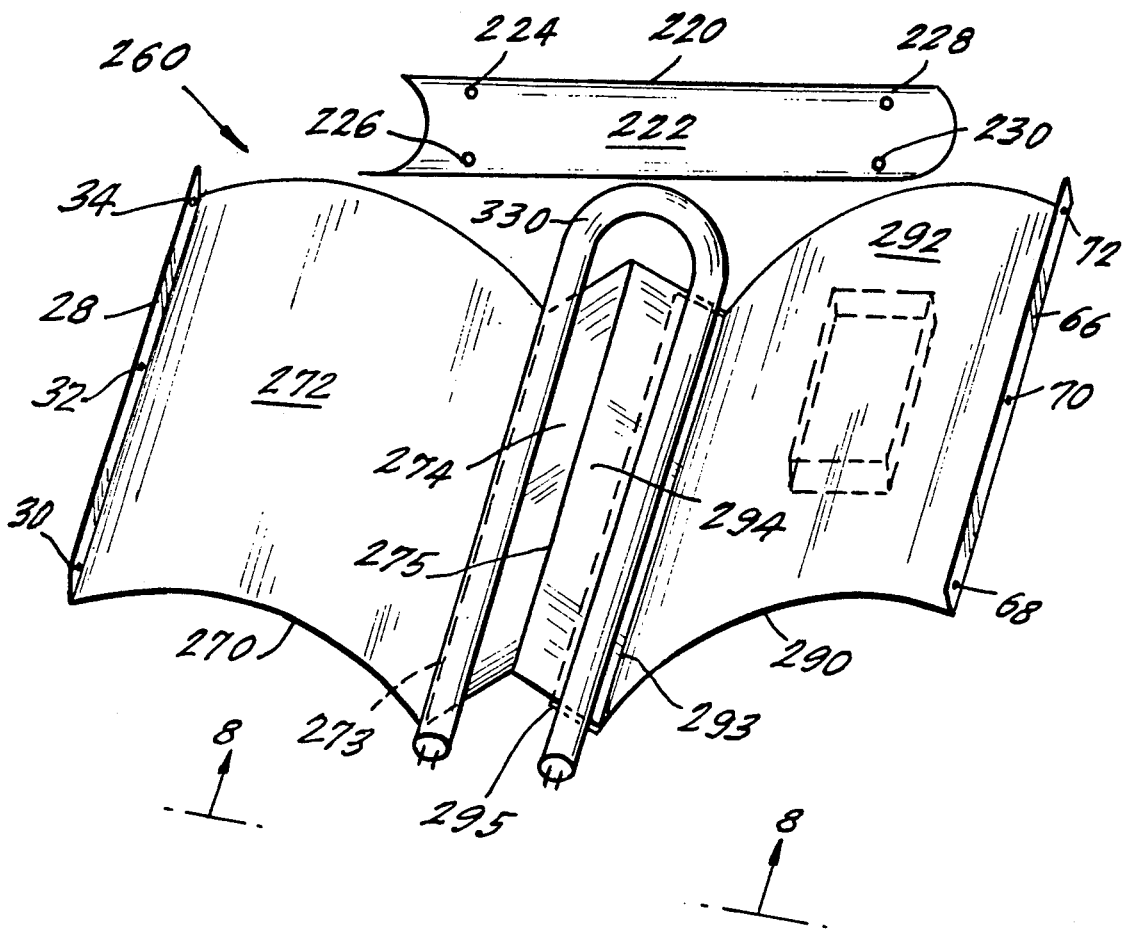
FIG. 7 shows a plan view of another reflector assembly of the invention for use with a single U-shaped fluorescent lamp, and in phantom, the position of a ballast located thereunder.
Figure 8:
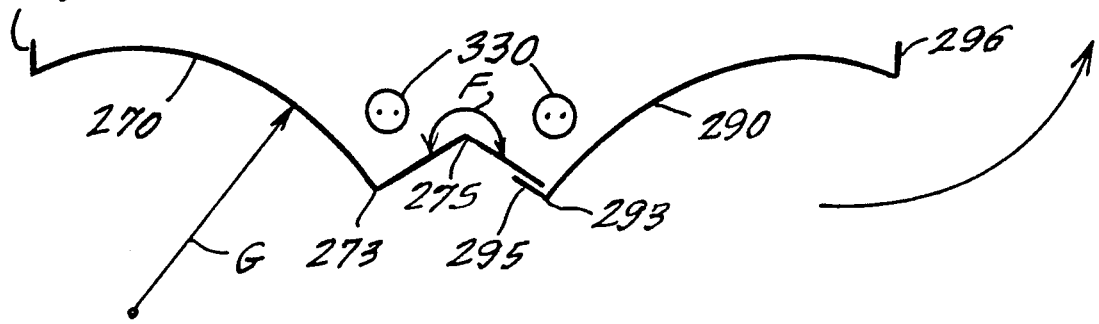
FIG. 8 shows an end view of the reflector assembly shown in FIG. 7 along lines 8—8 thereof and the angular orientation of several light reflecting surfaces of this reflector assembly.

Referring now to FIGS. 7 and 8, a reflector assembly 260 is shown in accordance with the principles of the invention but which is adapted for use with a single U-shaped fluorescent lamp 330. Reflector assembly 260 includes a first light reflecting section 270 and a second light reflecting section 290.

Light reflecting section 270 includes a first curved light reflecting surface 272 and a second substantially flat light reflecting surface 274. A crease 273 is located between these light reflecting surfaces. Light reflecting section 290 is equivalent to section 270. It includes curved light reflecting surface 292, flat light reflecting surface 294 and crease 293.

Flange 295 extends from a side 293 of light reflecting surface 292 located away from mounting flange 66 and fits underneath light reflecting surface 294. Crease 275 is located between light reflecting sections 270 and 290. Section 290 is removable in the direction shown by the arrow (FIG. 8) to access a ballast (shown in phantom) located beneath reflector assembly 260, more specifically, section 290. Lamp 330 is positioned with respect to reflector assembly 260 by a raceway (not shown) as discussed above such that its straight portions are substantially aligned with creases 273 and side 293 of surface 292 located away from mounting flange 66, and at a distance from crease 273 and the side 293 which will allow light to be brought around lamp 330 and out of the luminaire.

Referring to FIG. 8, it is preferred that surfaces 274 and 294 make an angle F with each other which is between about 200° and about 240°, most preferably between about 215° and about 225°, and section 270 has a radius of curvature between about 2.5 and about 3.5 inches, preferably between about 2.5 inches and about 3.0 inches. Section 290 has an equivalent radius of curvature.

Figure 9:
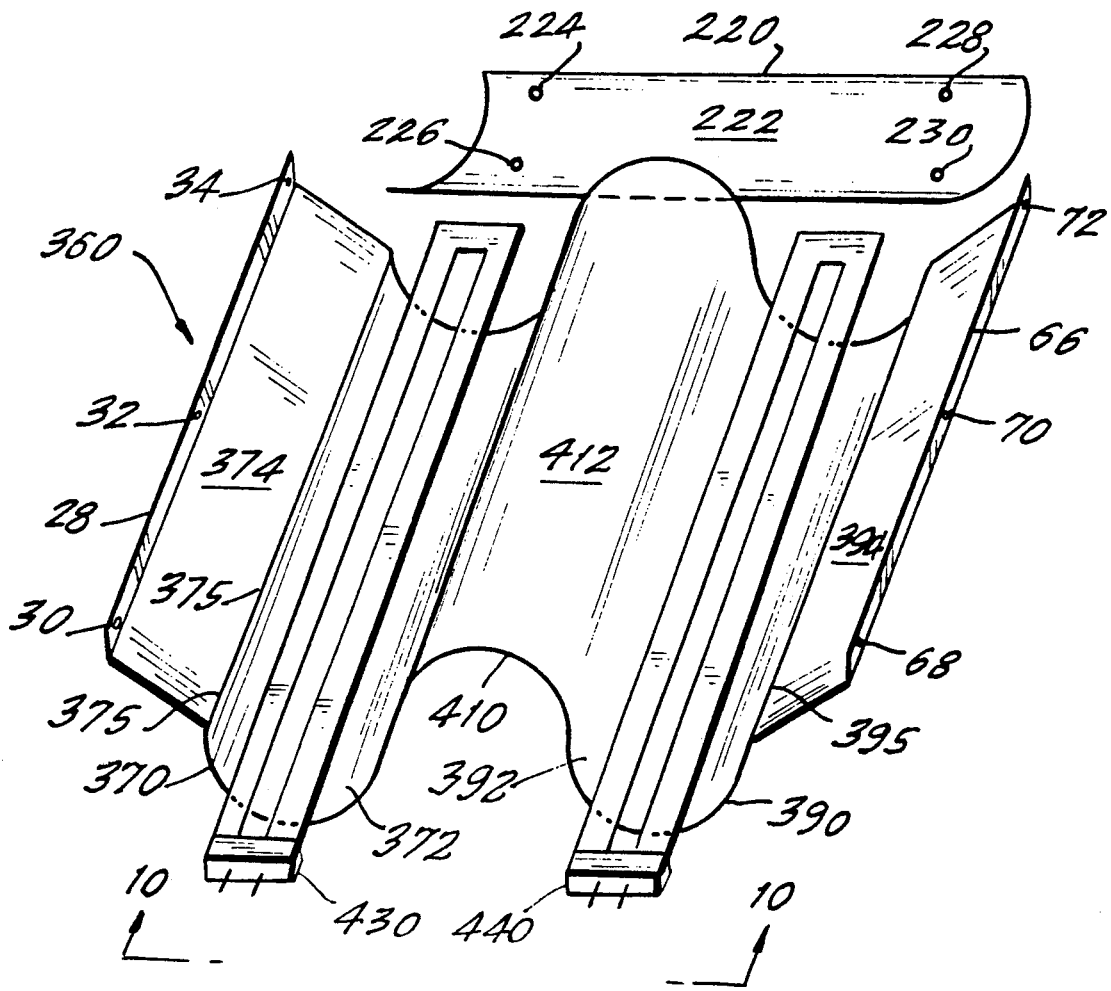
FIG. 9 shows a plan view of a reflector assembly of the invention for use with two twin tube, single-ended fluorescent light bulbs.
Figure 10:
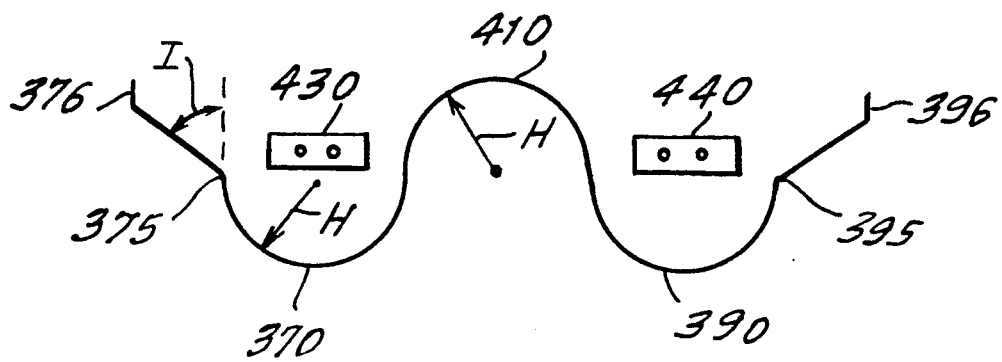
FIG. 10 shows an end view of the reflector assembly shown in FIG. 9 along lines 10—10 thereof and the angular orientation of several light reflecting surfaces of this reflector assembly.

Referring now to FIGS. 9 and 10, a reflector assembly 360 is shown in accordance with the principles of the invention which is adapted for use in fluorescent luminaires utilizing twin tube, single-ended fluorescent lamps, it being understood that straight tubes can be utilized with the reflector assembly shown therein. Two bulbs 430 and 440 are shown and are positioned with respect to reflector 360 by a raceway (not shown) as discussed above such that light is brought around lamps 430 and 440 and out of the luminaire. Reflector assembly 360 includes a first light reflecting section 370, a second light reflecting section 390 and a center light reflecting section 410.

Light reflecting section 370 includes curved light reflecting surface 372, adjacent substantially flat light reflecting surface 374 and crease 375 located therebetween. Light reflecting section 390 is equivalent to section 370 and includes curved light reflecting surface 392, adjacent substantially flat light reflecting surface 394 and crease 395. Curved light reflecting section 410 includes a curved light reflecting surface 412.

Referring to FIG. 10, it is preferred that sections 370 and 390 have a radius of curvature H between about 3.5 inches and about 7.5 inches, section 410 having a radius of curvature H' of about 3 inches to about 5 inches, and surfaces 374 and 394 make angle I with the vertical which is between about 30° and about 90°, most preferably between about 65° and about 85°.

It will be understood that twin tube single-ended lamps 430 and 440 can be oriented in an end-to-end manner, as shown in FIG. 9a, in a reflector assembly substantially the same as shown in FIG. 9, but modified to arrange light reflecting sections 370 and 390 in an end-to-end manner to provide one relatively long light reflecting section. A backplate reflector (not shown), as described above, may be utilized with this reflector assembly.

Although the present invention has been described in relation to the preferred embodiments thereof, many other variations and modifications will now become apparent to those skilled in the art without departing from the scope of the invention. It is preferred, therefore, that the present invention be limited not by the specific disclosure herein, but only by the appended claims.

What is claimed is:

1. A reflector assembly for a fluorescent luminaire which houses fluorescent lamps and a ballast, comprising:

first and second light reflecting sections fixed to said fluorescent luminaire, each section comprising a first light reflecting surface, a second light reflecting surface and a crease located between said surfaces, said first and second light reflecting surfaces being oriented at an angle less than 180° with respect to one another;

a specular coating disposed on said first and second light reflecting surfaces for reflecting light from said fluorescent lamps;

a raceway for holding said fluorescent lamps and for positioning said fluorescent lamps substantially in alignment with said creases and at a distance from said creases such that light emanating from said fluorescent lamps is substantially reflected around said fluorescent lamps and out of said luminaire to increase the lumen output thereof;

a removable light reflecting section attached to said first and second light reflecting sections, said removable light reflecting section covering said ballast and being removable from said first and second light reflecting sections for accessing said ballast; and means for removably attaching said removable light reflecting section to said first and second light reflecting sections.

2. The reflector assembly of claim 1, wherein said angle is between about 10° and about 170°.

3. The reflector assembly of claim 1, wherein said specular coating is a reflective tape or an anodic oxide coating.

4. The reflector assembly of claim 1, wherein said bulbs are positioned at a distance of about 1.5 to about 2 inches from said creases.

5. The reflector assembly of claim 1, wherein said raceway comprises a base portion for attaching said raceway to said fixture, an upstanding portion connected to said base portion, and a top portion extending substantially horizontally from said upstanding portion, said top portion having fluorescent lamp footer mounts for receiving said fluorescent lamps.

6. The reflector assembly of claim 1, further comprising at least one mounting flange located on at least one of said first and second light reflecting section for mounting said reflector assembly to said fluorescent luminaire.

7. The reflector assembly of claim 6, further comprising at least one mounting aperture located on said mounting flange for mounting said reflector assembly to said fluorescent luminaire.

8. The reflector assembly of claim 1, wherein said removable section is located between said first and second light reflecting sections.

9. The reflector assembly of claim 8, wherein said attaching means comprises a plurality of S-shaped brackets mounted on said first and second light reflecting sections and a plurality of cooperating rotatable arms located on said removable light reflecting section for engaging said brackets to lock said first and second light reflecting and removable sections together.

10. The reflector assembly of claim 8, wherein said removable light reflecting section is squeezable for disengaging said removable light reflecting section from said first and second light reflecting sections.

11. The reflector assembly of claim 10, wherein said attaching means comprises at least two flanges extending from said removable light reflecting section for releasably engaging said first and second light reflecting sections.

12. The reflector assembly of claim 1, wherein said removable light reflecting section comprises a portion of said first and said second light reflecting sections.

13. The reflector assembly of claim 12, wherein said attaching means comprises at least one flange extending from said portion of said first or said second light reflecting sections.

14. A reflector assembly for a fluorescent luminaire which houses two fluorescent lamps and a ballast, comprising:
    first and second light reflecting sections fixed to said fluorescent luminaire for reflecting light emanating from said fluorescent lamps;
    a removable light reflecting section attached to said first and second light reflecting sections, said removable light reflecting section being disposed over said ballast and being removable from said first and second light reflecting sections to provide access to said ballast; and
    means for removably attaching said removable light reflecting section to said first and second light reflecting sections.

15. The reflector assembly of claim 10, wherein said removable section is located between said first and second light reflecting sections.

16. The reflector assembly of claim 15, wherein said removable light reflecting section is squeezable for disengaging said removable light reflecting section from said first and second light reflecting sections.

17. The reflector assembly of claim 16, wherein said attaching means comprises at least two flanges extending from said removable light reflecting section for releasably engaging said first and second light reflecting sections.

18. The reflector assembly of claim 14, wherein said removable light reflecting section comprises a portion of said first and second light reflecting sections.

19. The reflector assembly of claim 18, wherein said attaching means comprises at least one flange extending from said portion of said first and second light reflecting sections.

20. The reflector assembly of claim 11, wherein said attaching means comprises a plurality of S-shaped brackets mounted on said first and said second light reflecting section and a plurality of cooperating rotatable arms located on said removable light reflecting sections which engage said brackets to lock said first and second light reflecting and removable sections together.

* * * * *